Dec. 27, 1960 S. DEAN 2,966,273
REMOTE CONTROL DEVICE

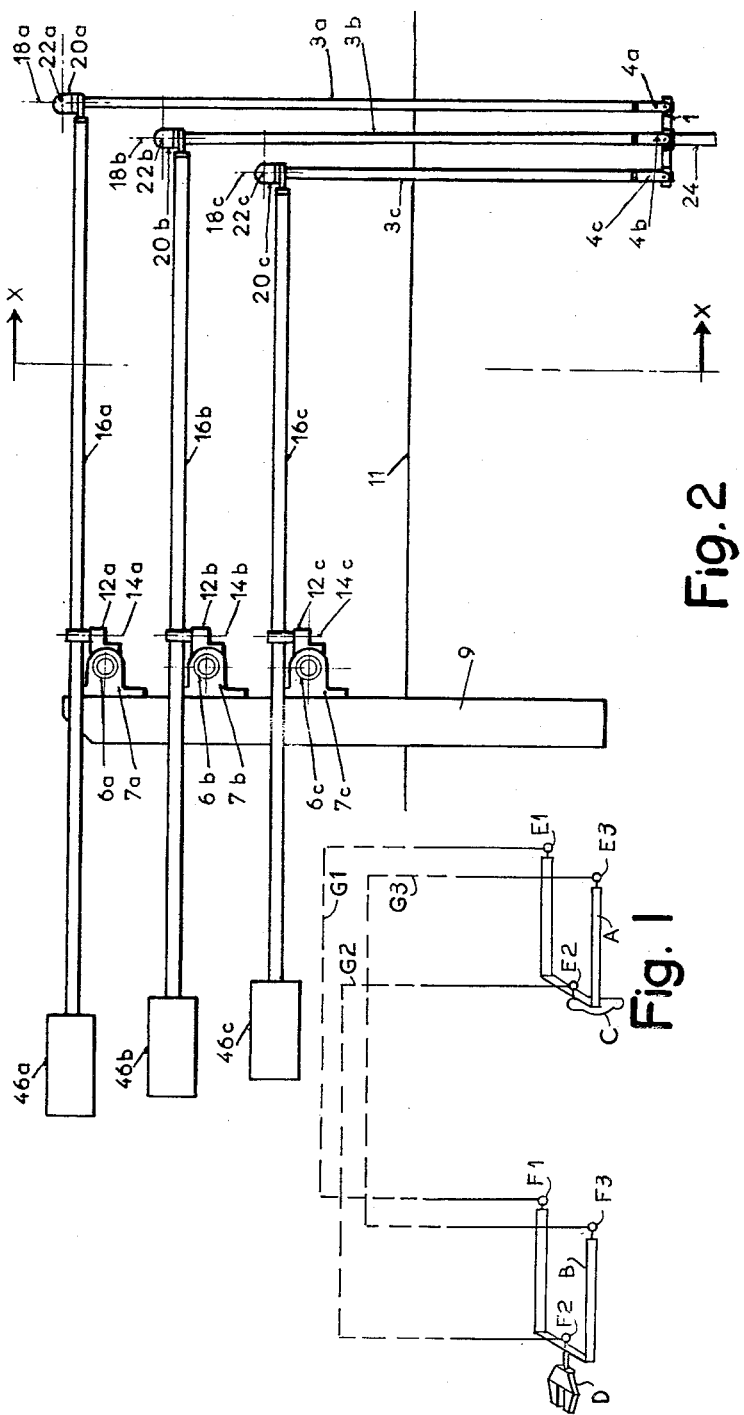

Filed Nov. 6, 1956 7 Sheets-Sheet 2

Dec. 27, 1960 S. DEAN 2,966,273
REMOTE CONTROL DEVICE
Filed Nov. 6, 1956 7 Sheets-Sheet 6

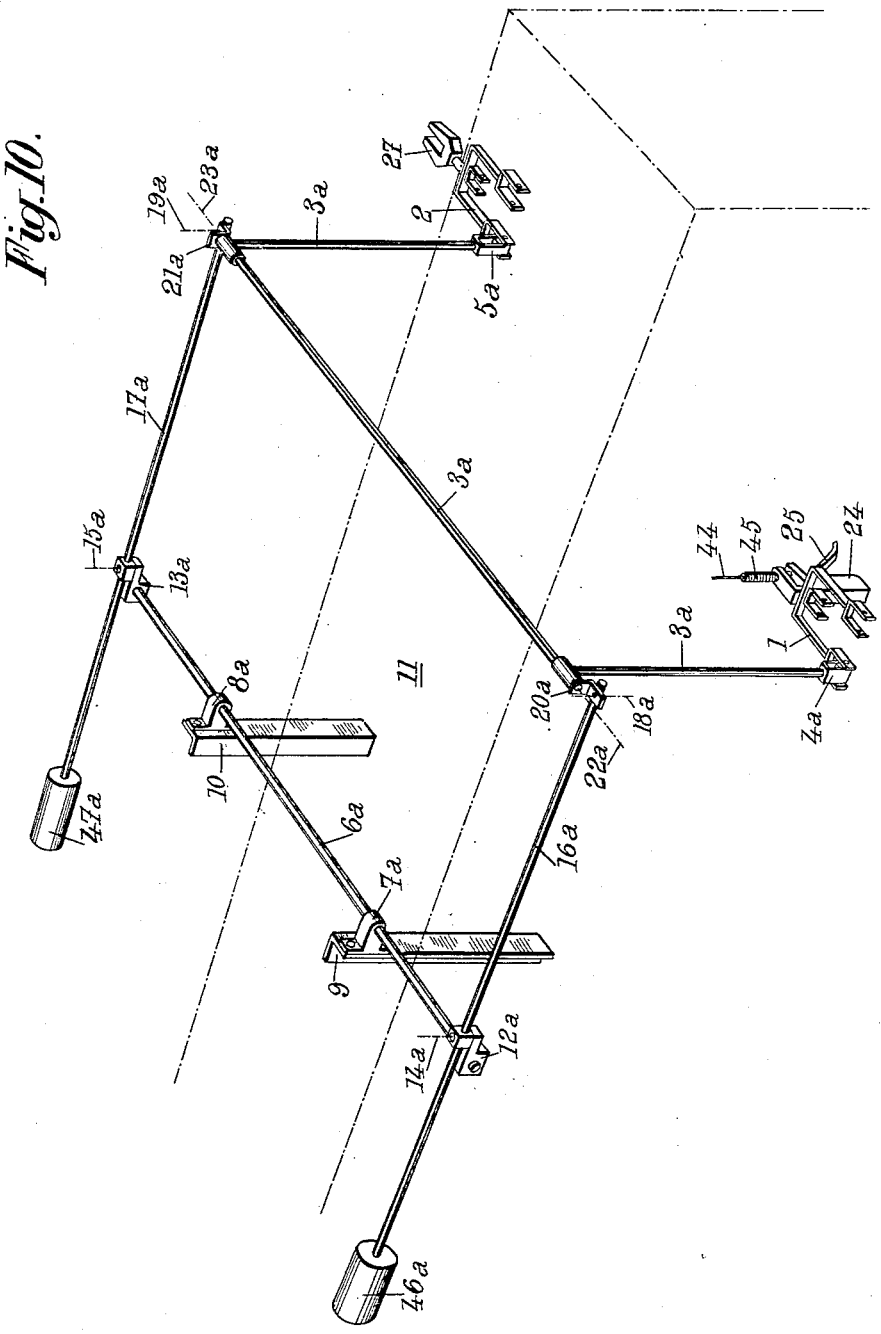

United States Patent Office 2,966,273
Patented Dec. 27, 1960

2,966,273

REMOTE CONTROL DEVICE

Stanley Dean, Paris, France, assignor to Commissariat a l'Energie Atomique, Paris, France, a state administration Filed Nov. 6, 1956, Ser. No. 620,706

Claims priority, application France Nov. 8, 1955

8 Claims. (Cl. 214—1)

The present invention relates to remote control devices, especially for handling radioactive bodies.

Its chief object is to provide a device of this kind which is simpler and less expensive than those existing up to now.

According to my invention, such a device includes two frames, one to be actuated directly by the person using the device and the other capable of handling the bodies, for instance by means of tongs carried by said last mentioned frame, three substantially identical distinct mechanisms being provided for connecting each one point of said frames respectively to a homologous point of the other frame so that any displacement imparted to one of said first mentioned points causes an identical displacement of said corresponding second mentioned point, whereby two vectors, fixed respectively in position with respect to these two frames, remain in the same position with respect to each other whatever be the displacements of these frames.

The remote control devices used up to now, especially for handling radioactive bodies, transmit through different means the movements imparted by an operator to a system of tools such as tongs.

There is at the present time a great number of such devices which permit of reproducing at a distance and in a more or less faithful manner the movements of the hand. Some of these apparatus even permit the desired manipulations on the other side of a protective shield.

However the remote control devices known at the present time are complicated, costly, and involve a great number of pulleys, cables and gears, so that their construction and their upkeep are difficult, and the present invention is intended to obviate these drawbacks.

In the device according to my invention, the three distinct mechanisms which serve to transmit the whole of the displacements of the three points of the first frame to three homologous points of the second frame may be constituted in a very simple manner by assemblies of rods, tubes or the like, which permits of eliminating most of the gears, pulleys and cables which are necessary in the known remote control devices used up to now.

Furthermore, the mechanisms through which the two frames are connected together and the number of which is reduced to three have a form such that they may pass above or through a protective shield. In the last mentioned case, the volume necessary for the passage of the mechanisms through the shield is sufficiently small to be reduced to a single conduit of reduced diameter and thus to maintain, in this area of the shield, an efficient fluid tightness.

Finally, the device according to my invention faithfully transmits the reactions of the bodies that are handled, such as pressure, weight, etc.

The remote control of the tools (such as tongs) may be performed by means of a cable or of any other suitable system, such as a mechanical, electrical, hydraulic, pneumatic or other system.

Preferred embodiments of the present invention will be hereinafter described with reference to the accompanying drawings, given merely by way of examples and in which:

Fig. 1 illustrates the principle of operation of the remote control device according to my invention.

Fig. 2 is a side view of a remote control device made according to a first embodiment of my invention.

Figure 8:
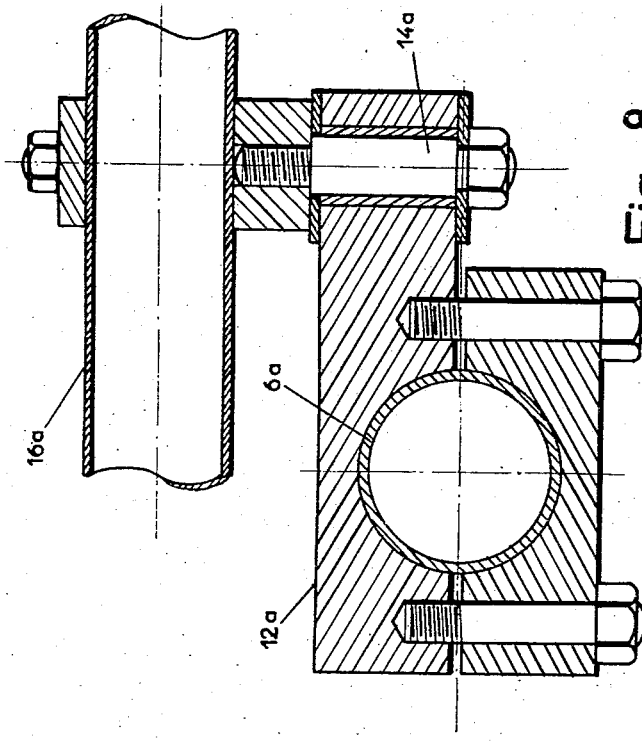
Figure 7:
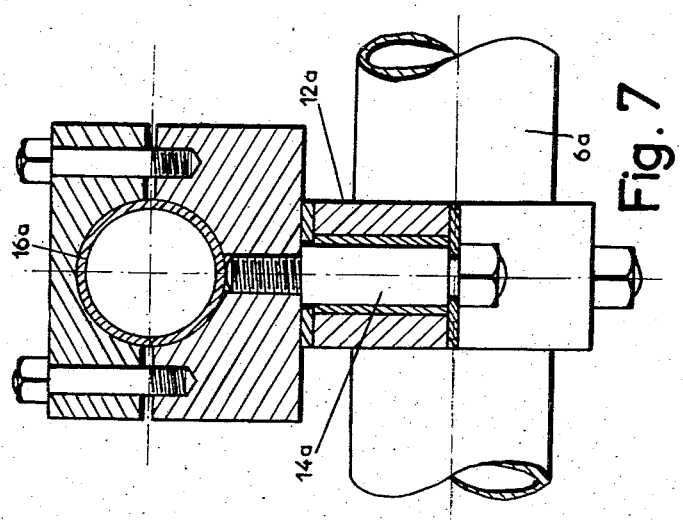

Figs. 7 and 8, the latter being a sectional view, show on an enlarged scale a detail of the mechanisms of this remote control device.

Figure 9:
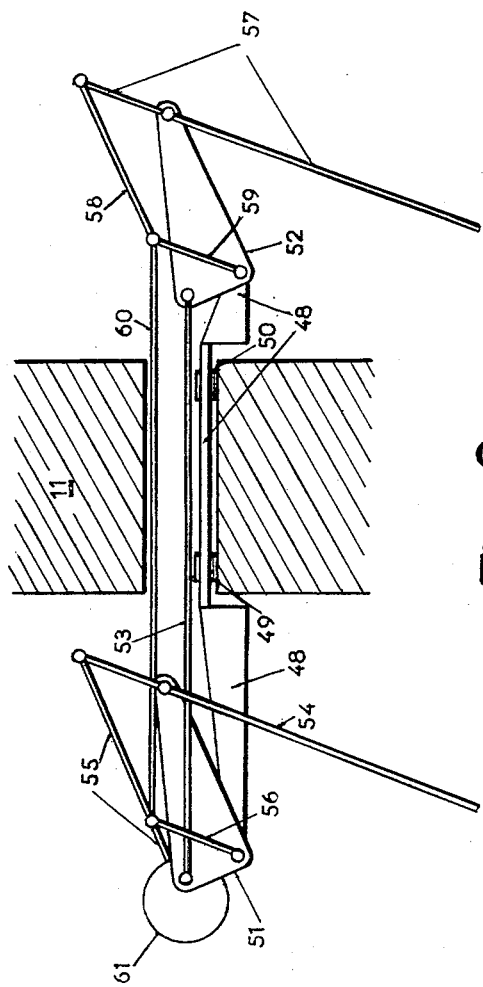

Fig. 9 shows a second embodiment of the remote control device according to my invention.

Fig. 10 is a perspective view of one of the three mechanisms used in the embodiment of Figs. 2 to 8.

The device diagrammatically shown by way of example on Fig. 1 includes two similar frames A and B. On frame A there is fixed a handle C and on frame B tongs D (or any other tool). Three points $E_1$, $E_2$ and $E_3$ of frame A are connected to three homologous points $F_1$, $F_2$ and $F_3$ respectively of frame B through three similar mechanisms $G_1$, $G_2$, $G_3$ by means of which any displacement of points $E_1$ of the first frame is reproduced exactly on the point $F_1$ of the second frame, any displacement of $E_2$ is reproduced by $F_2$ and any displacement of $E_3$ is reproduced by $F_3$. The joints may be swivel joints, Cardan joints or the like.

The principle of operation of this device is as follows:

The manner in which handle C is held defines the positions of points $E_1$, $E_2$, $E_3$. Thus, due to the provision of mechanisms $G_1$, $G_2$ and $G_3$, points $F_1$, $F_2$ and $F_3$ are located in homologous positions. Therefore, the position of frame B is similar to that of frame A, and the displacement of tongs D reproduces that of handle C. Operation of the tongs is obtained through a cable (or any mechanical, electrical, hydraulic, pneumatic or other system) which connects them to control means carried by the handle.

The first embodiment, illustrated by Figs. 2 to 8 and 10, includes two identical frames 1 and 2 (Figs. 2, 3 and 10) which are U-shaped. The two ends and the middle point of the base of frame 1 are connected with corresponding points of frame 2 through three tubular mechanisms 3a, 3b and 3c. Each of the mechanisms 3a, 3b and 3c is constituted by a non deformable assembly, that is to say by two vertical tubes connected together rigidly at their upper ends by a horizontal tube, the tubular shape being chosen to give a good resistance to twisting.

Figure 3:
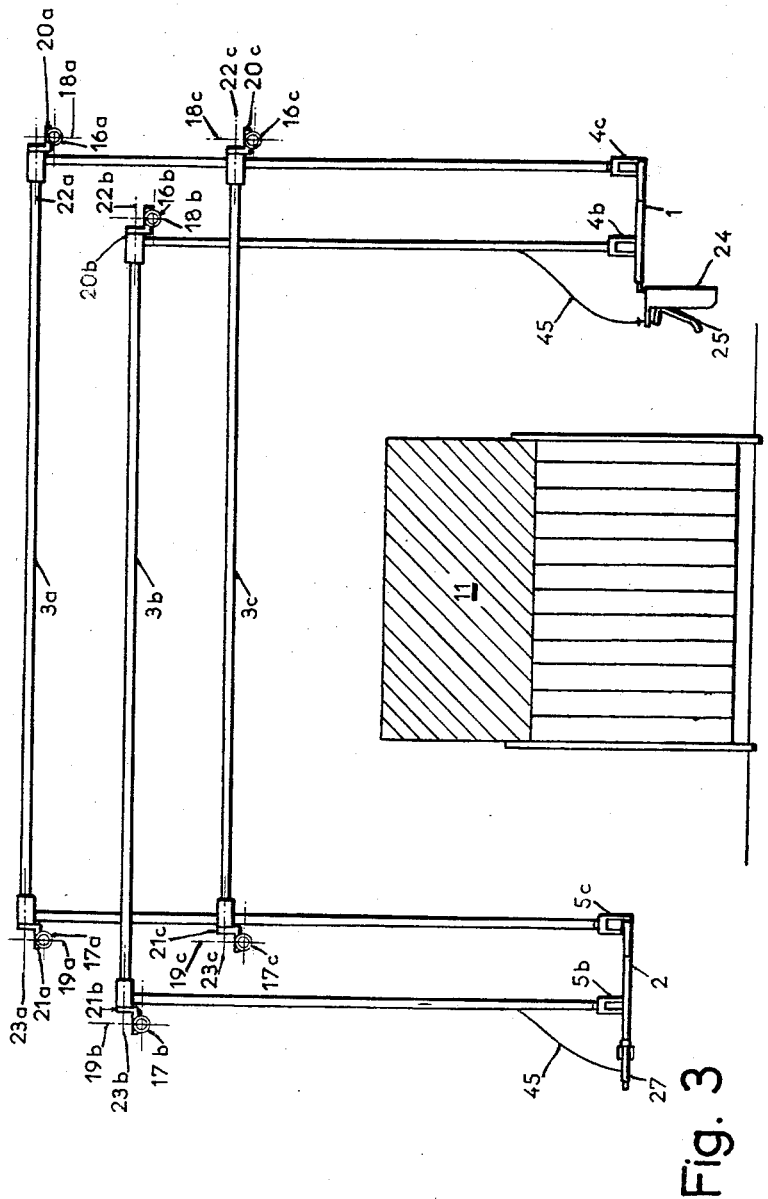
Fig. 3 is a sectional view of this device on the line X—X of Fig. 2.

Hinging connections between mechanisms 3a, 3b and 3c and frames 1 and 2 are obtained respectively by means of six Cardan joints 4a, 4b, 4c and 5a, 5b and 5c (Figs. 2, 3, 5 and 10), Cardan joints 4a and 5a being hidden on Fig. 3 by Cardan joints 4c and 5c. One of the forks of each Cardan joint is freely rotatable about a spindle which is fixed either on frame 1 or on frame 2, and the other fork is freely rotatable about a spindle which is fixed on one of the vertical tubes of mechanisms 3a, 3b or 3c. The forks of the Cardan joints are long in order to permit a large amplitude of rotation of frames 1 and 2 with respect to mechanisms 3a, 3b and 3c (see Figs. 5 and 6).

Figure 4:
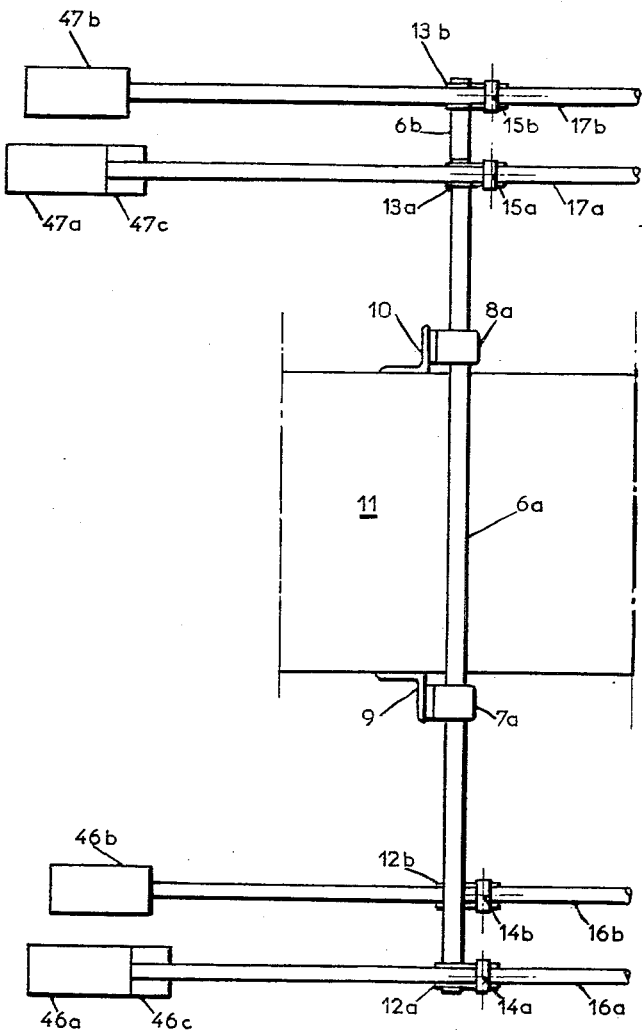
Fig. 4 is a partial plan view of the portion of the apparatus of Fig. 2 located on the left hand side of plane X—X.

Mechanism 3a is supported in the following manner: a horizontal tube 6a (Figs. 2, 4, 7, 8 and 10) is journalled in two bearings 7a and 8a (Figs. 2, 4 and 10). These bearings are mounted on two supports 9 and 10 which are fixed on the shield wall 11. Two blocks 12a and 13a (Figs. 2, 4, 7 and 8) are tightly held on the tube 6a. Two spindles 14a and 15a are journalled in the blocks 12a and 13a, and two levers 16a and 17a (Figs. 2, 3, 4, 7, 8 and 10) are fixed on these spindles.

At one end of lever 16a there is a spindle 18a parallel to spindle 14a (Figs. 2, 3 and 10). In a likewise manner, on the corresponding end of lever 17a there is provided a spindle 19a parallel to spindle 15a. Two angle irons 20a and 21a are respectively pivoted about spindles 18a and 19a. Mechanism 3a is provided at its two upper corners with two horizontal spindles 22a and 23a rigidly fixed on said mechanism and these last mentioned spindles are journalled in angle irons 20a and 21a respectively. The distance between spindles 14a and 15a (Fig. 4) must be equal to the distance between spindles 18a and 19a (Fig. 3). On the other hand, the distance between spindles 14a and 18a (Figs. 2 and 10) is equal to the distance between spindles 15a and 19a (Fig. 10).

Every displacement of the center of Cardan joint 4a (Figs. 2, 5, 6 and 10) is exactly reproduced by the center of the Cardan joint 5a.

Mechanisms 3b and 3c are supported in the same manner as mechanism 3a. On Figs. 2 to 6 I have shown, when they are visible, the parts corresponding to these mechanisms 3b and 3c. These parts are designated by reference numerals similar to those of mechanism 3a but respectively indexed b and c. Every displacement of Cardan joint 4b is identically reproduced by Cardan joint 5b and every displacement of Cardan joint 4c is identically reproduced by Cardan joint 5c.

Figure 5:
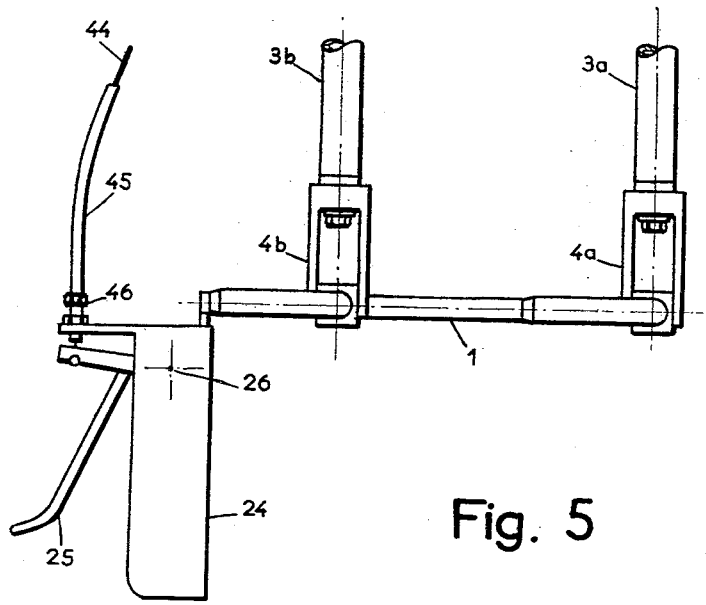
Figs. 5 and 6 show, respectively in elevational view and in plan view, one of the frames of the remote control device of Figs. 2, 3 and 4.
Figure 6:
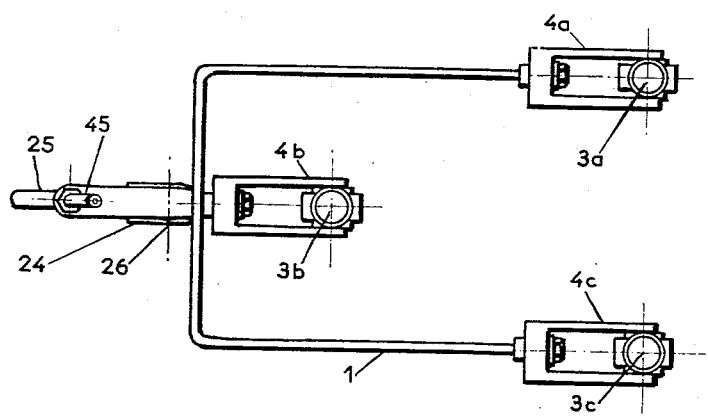

A handle 24 (Figs. 2, 3, 5, 6 and 10) is rigidly fixed on frame 1. This handle is provided with a lever 25 (Figs. 5 and 6) pivotable about a spindle 26. A pair of tongs 27 (Fig. 3) is mounted on frame 2. The opening of these tongs 27 is controlled by means of a flexible cable 44 (Fig. 5) located in a sheath 45 (Figs. 3, 5 and 6). For this purpose, one end of cable 44 is fixed to control lever 25, the other end being connected with one of the movable elements (not shown) of tongs 27.

The system is balanced by means of six counterweights 46a, 46b, 46c, 47a, 47b, 47c, respectively mounted on levers 16a, 16b, 16c, 17a, 17b, 17c, as shown on Figs. 2, 4 and 10, and which constantly keep the horizontal rods of mechanisms 3a, 3b and 3c in horizontal position.

In a second embodiment of my invention, the shape of the three mechanisms which connect the two frames together is studied in order to reduce the volume occupied by these mechanisms so as to permit of passing them through the protection shield. As in the preceding example, the three mechanisms are distinct and practically identical and one of them will be described with reference to Fig. 9.

The operation of this mechanism is as follows:

A support 48 is rotatable in two bearings 49 and 50, these two bearings being mounted in a hole extending throughout shield 11. Two triangular levers 51 and 52 are pivoted to the respective ends of support 48 and they are connected together by a rod 53 so as to form a parallelogram. An arm 54 is pivoted to lever 51 and two rods 55 and 56 are connected therewith so as to form a parallelogram with this lever and this arm. In a similar fashion, an arm 57 is pivoted to lever 52 and, with rods 58 and 59, there is thus formed another parallelogram. A rod 60 connects together rods 56 and 59 so as to form a parallelogram with support 48. A counterweight 61 is fixed on lever 55. Rods 53 and 60 and support 48 extend through the shield 11 as shown on Fig. 9.

Three mechanisms of this type are disposed side by side and the U-shaped frames are fixed to the lower ends of arms 54 and 57 by Cardan joints as in the first described embodiment of the remote control device. The handle is fixed to the frame carried by arms 54 and the tongs are fixed on the frame carried by arms 57.

What I claim is:

1. A remote control system which comprises, in combination, a first rigid frame and a second rigid frame, the first frame to be actuated directly by the operator, means carried by the second frame for effecting a given manipulation, a fixed support, and three substantially identical distinct mechanisms, each movably carried by said support independently of the two others, for connecting three points of said first frame to three homologous points of said second frame respectively so that any displacement imparted to one of said three first mentioned points produces an identical displacement of that of said three second mentioned points which is homologous thereto, said three first mentioned points being located at the vertices of a triangle identical to, and having its sides parallel respectively to those of, the triangle the apexes of which coincide with three second mentioned points respectively whereby two vectors similarly related to said two frames respectively remain in the same relative relation with respect to each other for all positions of these frames.

2. A device according to claim 1 further including counterweight means for balancing said mechanisms.

3. A remote control system which comprises, in combination, a first rigid frame and a second rigid frame, the first frame to be actuated directly by the operator, means carried by the second frame for effecting a given manipulation, a fixed support, and three substantially identical distinct mechanisms, each movably carried by said support independently of the two others, for connecting three points of said first frame to three homologous points of said second frame respectively so that any displacement imparted to one of said three first mentioned points produces an identical displacement of that of said three second mentioned points which is homologous thereto, said three first mentioned points being located at the vertices of a triangle identical to, and having its sides parallel respectively to those of, the triangle the apexes of which coincide with the three second mentioned points respectively, whereby two vectors similarly related to said two frames respectively remain in the same relative relation with respect to each other for all positions of these frames, each mechanism consisting of an assembly of rods and universal joint means for pivotally connecting two ends rods of each of said rod assemblies to each of the two frames at the two corresponding points thereof, respectively.

4. A device according to claim 3 in which each of said mechanisms is constituted, in addition to said two end rods, by a plurality of rods hinged together to form two deformable parallelograms having one side in common, one of said parallelograms having its respective sides which are adjacent to said first mentioned common side pivoted about corresponding points of said two end rods, respectively, and two parallelograms each having one side constituted by a portion of one of said end rods and the opposite side constituted by one of the sides of the second of the two first mentioned parallelograms which are adjacent to said common side.

5. A device according to claim 4 in which said common side of said two first mentioned parallelograms and the two other parallelogram sides parallel thereto are close to one another, and means are provided for guiding one of them along a horizontal line.

6. A remote control system which comprises, in combination, a first rigid frame and a second rigid frame, the first frame to be actuated directly by the operator, means carried by the second frame for effecting a given manipulation, a fixed support, and three substantially identical distinct mechanisms, each movably carried by said support independently of the two others, for connecting three points of said first frame to three homologous points of said second frame respectively so that any displacement imparted to one of said three first mentioned points produces an identical displacement of that of said three second mentioned points which is homologous thereto, said three first mentioned points being located at the vertices of a triangle identical to, and having its sides parallel respectively to those of, the triangle the apexes of which coincide with the three second mentioned points respectively whereby two vectors similarly related to said two frames respectively remain in the same relative relation with respect to each other for all positions of these frames, each mechanism consisting of a rigid assembly of rods and universal joint means for pivotally connecting two end rods of each of said rod assemblies to each of the two frames at the two corresponding points thereof, respectively.

7. A device according to claim 6 in which each assembly is constituted in addition to said two end rods, by a third rod rigidly connected to said two end rods to hold them parallel to each other.

8. A device according to claim 4 further including means for keeping said third rod constantly horizontal.

References Cited in the file of this patent

UNITED STATES PATENTS 2,632,574     Goertz _____ Mar. 24, 1953

FOREIGN PATENTS 258,218     Germany _____ Mar. 29, 1913